US009440519B2

(12) United States Patent
Choi

(10) Patent No.: US 9,440,519 B2
(45) Date of Patent: Sep. 13, 2016

(54) SLIDING DOOR SUPPORTING DEVICE OF VEHICLE AND SLIDING DOOR DEVICE USING THE SAME

(71) Applicant: Hyundai Motor Company, Seoul (KR)

(72) Inventor: Jaehong Choi, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/548,594

(22) Filed: Nov. 20, 2014

(65) Prior Publication Data
US 2015/0291015 A1   Oct. 15, 2015

(30) Foreign Application Priority Data

Apr. 9, 2014   (KR) ........................ 10-2014-0042596

(51) Int. Cl.
| B60J 5/06 | (2006.01) |
|---|---|
| B60J 5/12 | (2006.01) |
| E06B 3/50 | (2006.01) |
| E05D 15/10 | (2006.01) |
| E05F 1/16 | (2006.01) |

(52) U.S. Cl.
CPC .. B60J 5/06 (2013.01); B60J 5/12 (2013.01); E05D 15/101 (2013.01); E05F 1/16 (2013.01); E06B 3/50 (2013.01); E06B 3/5072 (2013.01); E05D 2015/1031 (2013.01); E05Y 2201/478 (2013.01)

(58) Field of Classification Search
CPC ...... E06B 3/50; E06B 3/5054; E06B 3/5009; E06B 3/5072; E06B 3/509; B60J 5/06; B60J 5/062; B60J 5/12; B60J 5/125; E05F 3/02; E05F 15/30; E05F 15/32; E05F 15/48; E05F 1/1091

USPC ............... 49/210, 209; 296/146.12, 155
See application file for complete search history.

(56) References Cited

U.S. PATENT DOCUMENTS

| 5,992,918 | A * | 11/1999 | Gobart et al. ........... 296/146.13 |
| 6,860,543 | B2 * | 3/2005 | George et al. ........... 296/146.12 |
| 7,347,483 | B2 * | 3/2008 | De Bono .................. 296/146.12 |
| 7,950,719 | B2 * | 5/2011 | Elliott et al. ................... 296/155 |
| 8,096,606 | B2 * | 1/2012 | Hanaki et al. ................ 296/155 |
| 8,307,497 | B2 * | 11/2012 | Chang et al. ...................... 16/71 |
| 2012/0031004 | A1 | 2/2012 | Boettcher | |

FOREIGN PATENT DOCUMENTS

| DE | 202010003634 U1 * | 9/2011 |
| FR | 2746059 A1 * | 9/1997 |
| JP | 3042973 B2 | 3/2000 |
| JP | 2006-213315 A | 8/2006 |
| JP | 2008-202236 A | 9/2008 |
| KR | 1988-0007275 A | 8/1988 |
| KR | 1992-0008090 B1 | 9/1992 |

* cited by examiner

*Primary Examiner* — Katherine Mitchell
*Assistant Examiner* — Marcus Menezes
(74) *Attorney, Agent, or Firm* — Morgan, Lewis & Bockius LLP

(57) ABSTRACT

A sliding door support apparatus of a vehicle may include a rail of which one end is mounted to be pivotably movable to a vehicle body, a slider fitted movably along the rail and coupled thereto, and connected in a pivotably movable manner to a front lower portion of a vehicle door, and a gas spring connected to the slider to apply an external force to the vehicle door through the slider through an outer side along a width direction of the vehicle.

7 Claims, 5 Drawing Sheets

SLIDING DOOR SUPPORTING DEVICE OF VEHICLE AND SLIDING DOOR DEVICE USING THE SAME

CROSS-REFERENCE TO RELATED APPLICATION

The present application claims priority to Korean Patent Application No. 10-2014-0042596 filed Apr. 9, 2014, the entire contents of which is incorporated herein for all purposes by this reference.

BACKGROUND OF THE INVENTION

1. Field of the Invention

The present invention relates to a sliding door of a vehicle. More particularly, the present invention relates to a sliding door support apparatus supporting a sliding door that opens/closes a door opening of a vehicle body by being moved to a front side or a rear side along a length direction of the vehicle to perform smooth sliding movement, and a sliding door device of a vehicle using the same.

2. Description of Related Art

In general, a vehicle has a predetermined sized cabin formed therein for boarding of a driver and accompanying occupants therein, and cabin opening/closing doors mounted to the vehicle body for opening/closing the cabin.

In a case of a passenger vehicle, the cabin opening/closing doors are front doors mounted to a front side of the vehicle in the length direction of the vehicle, and rear doors mounted to a rear side of the vehicle in the length direction of the vehicle, wherein, in general, the front doors and the rear doors are rotatably mounted to the vehicle body with hinges.

In a case of a van in which many people may board, the cabin opening/closing door opens/closes the cabin as the cabin opening/closing door slides forward/backward in the length direction of the vehicle.

Since the sliding door in the van opens the cabin as the opening/closing door moves backward in the length direction of the vehicle, and closes the cabin as the opening/closing door moves forward in the length direction of the vehicle, the sliding type of cabin opening/closing door in the van has a smaller space requirement for opening/closing the door than the hinge type of cabin opening/closing door in the passenger vehicle, to have an advantage of opening the door opening formed in the vehicle body completely even in an opening/closing space with a small width.

In a sliding door device of a vehicle provided with such a conventional sliding door, a sliding door support apparatus that supports smooth forward/backward sliding movement of the sliding door along a length direction of the vehicle in the sliding door device is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a sliding door support apparatus of a vehicle that can improve marketability of the vehicle by stably supporting a sliding door to a vehicle body for smooth sliding movement of the sliding door when the sliding door slides forward and backward along a rail in a length direction of the vehicle, and a sliding door device of the vehicle using the same.

According to various aspects of the present invention, a sliding door support apparatus of a vehicle may include a rail of which one end is mounted to be pivotably movable to a vehicle body, a slider fitted movably along the rail and coupled thereto, and connected in a pivotably movable manner to a front lower portion of a vehicle door, and a gas spring connected to the slider to apply an external force to the vehicle door through the slider through an outer side along a width direction of the vehicle.

A vehicle body bracket may be mounted in a fixed manner to the vehicle body, a swing bracket at the vehicle body may be relatively rotatably mounted to the vehicle body bracket, and one end of the rail may be coupled to the swing bracket at a vehicle body side.

The vehicle body bracket may include a bracket body substantially formed in a shape of an "L" and mounted in a fixed manner to the vehicle body, and a rotation shaft integrally formed in a height direction of the vehicle to the bracket body, and the swing bracket at the vehicle body side may include a shaft hole to which the rotation shaft is fitted and is thus rotatably coupled thereto, and a swing bracket body substantially formed in a shape of a "U" and to which one end of the rail is mounted.

The rail may include a pair of second lower rail bodies formed substantially in a shape of a quadrangle and forming a channel therebetween by being disposed at a distance from each other, and the slider may be coupled to the channel to be movable along the channel.

A coupling hole extended along a length direction of the slider may be formed at one front end of the slider, a swing bracket at the door side may be integrally coupled to the coupling hole, and the swing bracket at a door side may be relatively rotatably coupled with respect to a door bracket mounted in a fixed manner to a front lower portion of the vehicle door.

The swing bracket at the door side may include a swing bracket body substantially formed in a shape of a "T"; and a shaft hole formed at one front end of the swing bracket body, and the door bracket may include a rotation shaft rotatably inserted in the shaft hole and is thus rotatably coupled thereto.

According to various aspects of the present invention, a sliding door device may include the sliding door support apparatus of the vehicle, a rear lower support device supporting a rear lower portion of the vehicle door to be slidably-movable, and an upper support device supporting an upper portion of the vehicle door to be slidably movable.

The rear lower support device may include a rail extended along a length direction of the vehicle and mounted to the rear lower support device, a slider coupled to be movable along the rail, and a lower support of which one end is coupled to the slider and another end is coupled to the rear lower portion of the vehicle door.

The upper support device may include an upper rail mounted in a fixed manner to the vehicle door along a width direction of the door, an upper slider coupled to be movable along the upper rail, and an upper support of which one end is connected to the upper slider and another end is mounted to the vehicle body to support the upper slider to be linearly movable with respect to the vehicle body.

Since the sliding door support apparatus of the vehicle and the sliding door device using the same according to various embodiments of the present invention are provided, the upper portion of the sliding door is sliding-movably supported by the vehicle body through the upper rail, the upper slider, and the upper support, the rear lower portion of the sliding door is sliding-movably supported by the vehicle body through the first lower rail, the first lower slider, and the first lower support, the front lower portion of the sliding door is sliding-movably supported by the vehicle body through the second lower rail, the second lower slider, and the second lower support such that when the sliding door slides frontward and backward along the length direction of the vehicle, the sliding door is stably supported at the upper first portion and the lower second portion, thereby performing smooth sliding movement.

As described, a door opening of a vehicle body is opened/closed while the sliding door smoothly slides forward and backward along the length direction of the vehicle so that opening/closing operation of the sliding door of the vehicle is simplified and marketability of the vehicle can be improved.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A sliding door support apparatus of a vehicle according to an exemplary embodiment of the present invention may be applied to a front sliding door or a rear sliding door that opens/closes a door opening of a vehicle body by being slidably moved along a length direction of the vehicle.

Figure 1:
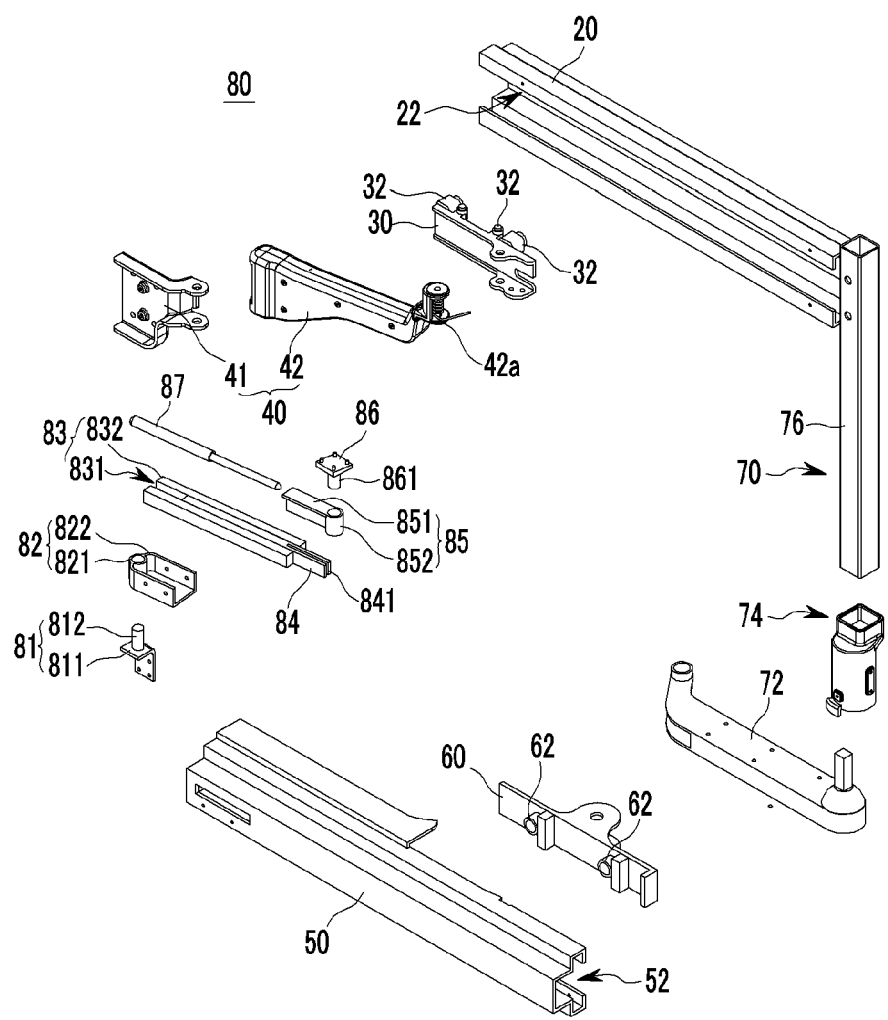
FIG. 1 is an exploded perspective view of a sliding front door and an exemplary support structure according to an exemplary embodiment of the present invention.
Figure 2:
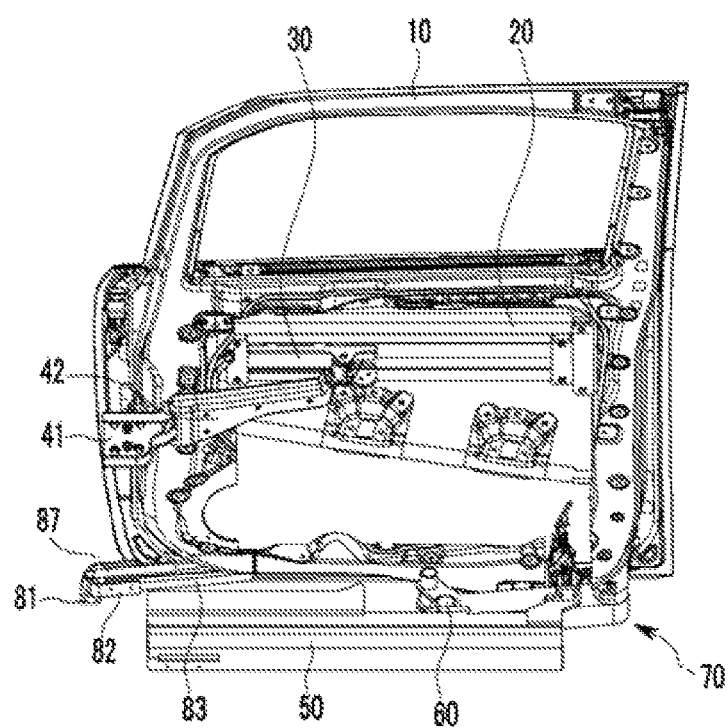
FIG. 2 is a front view of a state in which the front door to which the exemplary support apparatus is mounted is in a closed state according to the present invention.

Referring to FIG. 1 and FIG. 2, an upper rail 20 is mounted in a fixed manner to a height directional center portion of a front door 10 of a vehicle along a width direction of the front door 10.

The upper rail 20 is provided with a channel 22 extended along the width direction of the front door 10.

The channel 22 includes an opening provided toward a cabin, and an upper slider 30 is inserted through the opening and then coupled with the upper rail 20.

The upper slider 30 supports the upper rail 20 and the front door 10 for the front door 10 to smoothly slide when the front door 10 moves frontward/rearward along the length direction of the vehicle.

The upper slider 30 includes at least one roller 32 inserted in the channel 22 and rolling.

An upper support 40 of which one end is connected to the upper slider 30 and the other end is mounted to the vehicle body is provided to support the upper slider 30 to be linearly movable with respect to the vehicle body.

The upper support 40 includes an upper arm 42 of which one end is relatively rotatably connected to the upper slider 30 through a pivot shaft 42a, and an upper mounting bracket 41 of which one end is relatively rotatably connected to the other end of the upper arm 42 and the other end is mounted in a fixed manner to the vehicle body.

Accordingly, an upper portion of the front door 10 is coupled sliding-movably frontward and rearward along the length direction of the vehicle and then supported through the upper rail 20 coupled to the upper slider 30 and the upper support 40.

The upper rail, the upper slider, and the upper support form an upper portion support device that sliding-movably supports an upper portion of the front door 10.

A first lower rail 50 extended along the length direction of the vehicle is mounted in a fixed manner to a predetermined portion of the vehicle, adjacent to the door opening that is formed in the vehicle body and opened/closed by the front door 10.

The first lower rail 50 includes a channel 52 extended along the length direction of the vehicle, and the channel 52 includes an opening that is opened to an outer side of the cabin.

A first lower slider 60 is inserted through the opening and is thus movably coupled.

The first lower slider 60 includes at least one roller 62 inserted in the channel 52 and rolling.

A lower support 70 of which one end is coupled to the first lower slider 60 and the other end is coupled to a rear lower portion of the front door 10 is provided.

The lower support 70 includes a lower arm 72 of which one end is relatively rotatably coupled to the first lower slider 60 through a hinge pin, a rotation joint 74 mounted to the other end of the lower arm 72, and a support arm 76 of which one end is coupled to the rotation joint 74 and the other end is fixed along a height direction to the front door 10.

The rotation joint 74 enables relative rotation between the support arm 76 and the lower arm 72.

The first lower rail 50, the first lower slider 60, and the lower support form a lower support device that sliding-movably supports a rear lower portion of the front door 10.

A support apparatus 80 according to various embodiments of the present invention is provided to support a front lower portion of the front door 10.

That is, a vehicle body bracket 81 is mounted in a fixed manner to a predetermined portion of the vehicle body, adjacent to the door opening.

The vehicle body bracket 81 includes a bracket body 811 substantially formed in the shape of an "L" and mounted in a fixed manner to the vehicle body, and a rotation shaft 812 formed integrally to the bracket body 811 in the height direction of the vehicle.

A swing bracket 82 at the vehicle body side is rotatably coupled to the rotation shaft 812 of the vehicle body bracket 81.

The swing bracket 82 at the vehicle body side includes a shaft hole 821 to which the rotation shaft 812 is coupled in a fitted manner, and a swing bracket body 822 substantially formed in the shape of "U" and to which a second lower rail 83 is mounted.

One end of the second lower rail 83 is fixed in a fitted manner in the swing bracket body 822.

The second lower rail 83 includes a pair of second lower rail bodies 832 substantially formed in the shape of a square pipe and disposed at a distance from each other such that a channel 831 is formed therebetween.

A second lower slider 84 is inserted in the channel 831 and thus is coupled to be movable along the channel 831.

A coupling hole 841 extended along a length direction of the second lower slider 84 is formed at one front end of the second lower slider 84.

A door-side swing bracket 85 is inserted in the coupling hole 841 and is thus integrally coupled thereto.

The swing bracket 85 at the door side includes a swing bracket body 851 substantially formed in the shape of a "T", and a shaft hole 852 formed at one front end of the swing bracket body 851.

A door bracket 86 mounted in a fixed manner to a front lower portion of the front door 10 is fitted to the shaft hole 852 and is thus rotatably coupled thereto.

The door bracket 86 includes a rotation shaft 861 inserted in the shaft hole 852 and is thus rotatably coupled thereto.

One end of a gas spring 87 is connected to the swing bracket 82 at the vehicle body side and the other end thereof is connected to the swing bracket 85 at the door side.

The gas spring 87 is filled with a gas and thus the length of the gas spring 87 is elastically stretchable due to a gas pressure.

FIG. 2 exemplarily illustrates a closed and sealed state in which the front door 10 closes the door opening formed in the vehicle body.

The front door 10 is supported by the vehicle body at a central first portion along the height direction the front door 10 and a second portion at a front lower portion and a rear lower portion of the front door 10.

Figure 3:
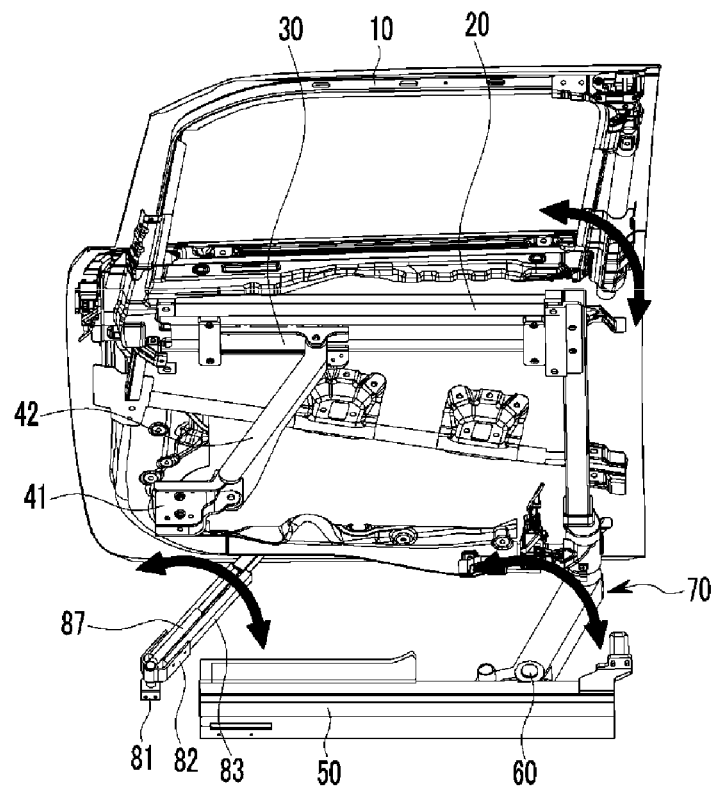
FIG. 3 is a diagram provided for description of the front door to which the exemplary support apparatus is mounted in an initial stage of opening.

Referring to FIG. 3, when a user operates a handle of the front door 10 to open the front door 10 while the front door 10 is in the closed state, the front door 10 linearly moves to an outer side of the vehicle in a width direction and a length directional front side while being supported through the supports at the upper first portion and the lower second portion.

That is, the upper support 40 supports the upper portion of the front door 10 while rotating in the anticlockwise direction with respect to the vehicle body, the support apparatus 80 supports the front lower portion of the front door 10 while rotating in the anticlockwise direction with respect to the vehicle body, and the lower support 70 supports the rear lower portion of the front door 10 while rotating in the anticlockwise direction with respect to the vehicle body.

Figure 4:
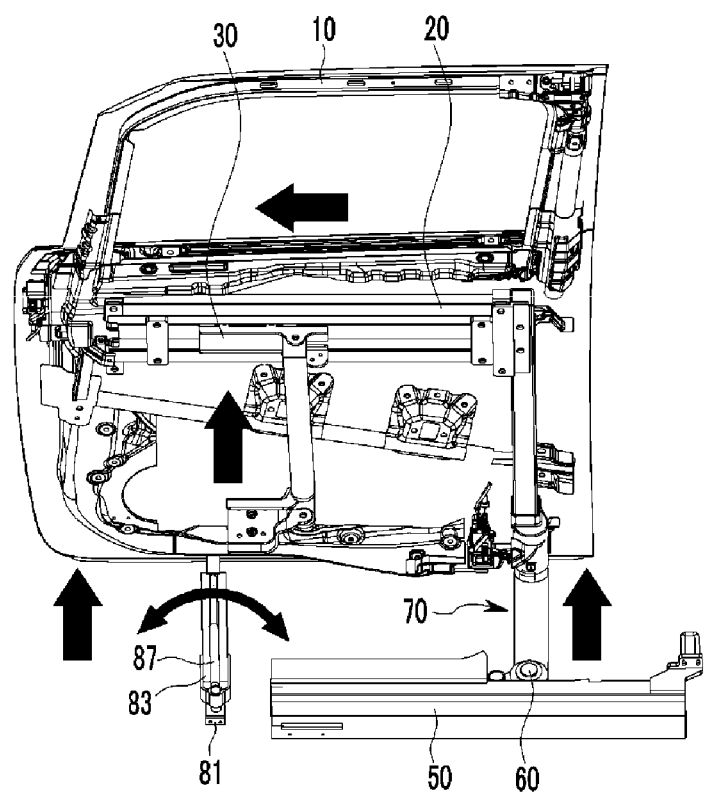
FIG. 4 is a diagram provided for description of the front door to which the exemplary support apparatus is mounted in the opening process according to the present invention.
Figure 5:
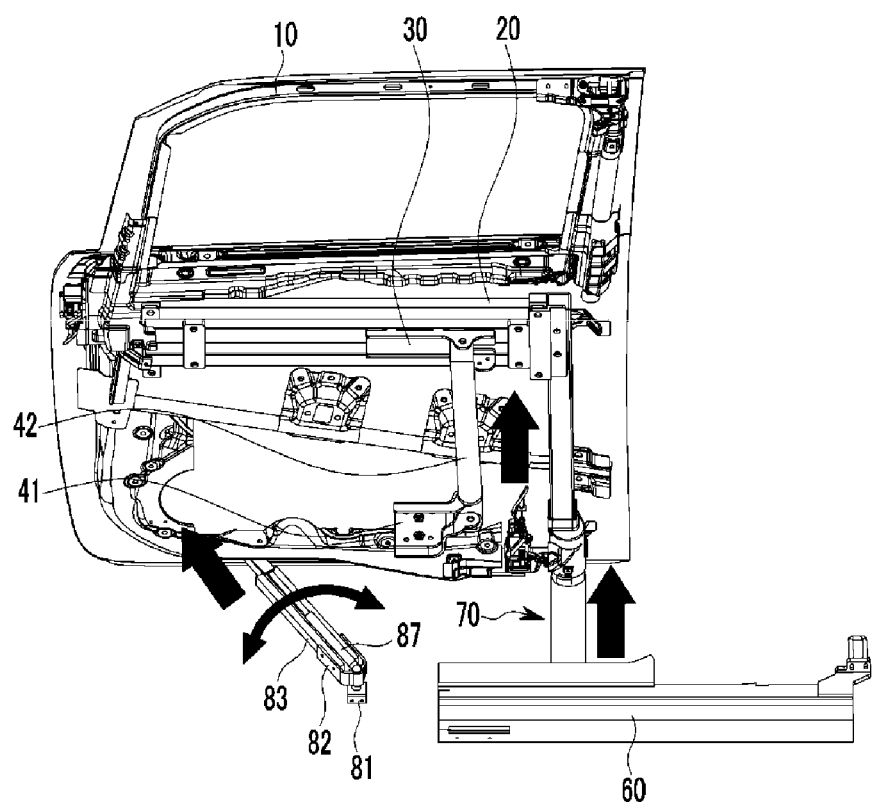
FIG. 5 is a diagram provided for description of the front door to which the exemplary support apparatus is completely opened according to the present invention.

After completion of the linear movement of the front door 10, as shown in FIG. 4, when the user pushes the front door 10 to the front side along the length direction of the vehicle, the front door 10 is supported through the upper support 40 at the upper portion thereof and at the same time the lower portion of the front door 10 is supported by the support apparatus 80 at the front side and the lower support 70 at the rear side, and thus the front door 10 slidably moves to the front side along the length direction of the vehicle while being stably supported in the shape of a triangle by the vehicle body.

When the frontward sliding movement of the front door 10 is continued, the upper support and the rear lower support 70 of the front door 10 become close to each other such that the support structure of the front door 10 becomes unstable, but the support apparatus 80 according to various embodiments of the present invention stably supports the front lower portion of the front door 10 while performing pivot movement with respect to the vehicle body, and accordingly, the sliding movement of the front door 10 can be smoothly and stably performed.

That is, the gas spring 87 of the support apparatus 80 pushes the front door 10 to the outer side in the width direction of the vehicle to prevent movement of the front door 10 and at the same time to make the second lower rail 83 and the second lower slider 84 support the front lower portion of the front door 10 to the vehicle body so that the frontward and rearward sliding movement of the front door 10 can be stably and smoothly performed.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sliding door support apparatus of a vehicle, comprising:
   a first rail of which one end is mounted to be pivotably movable to a vehicle body;
   a first slider fitted movably along the first rail and coupled thereto, and pivotally connected to a front lower portion of a vehicle door; and
   a gas spring connected to the first slider to apply an external force to the vehicle door through the first slider outwards the vehicle body along a width direction of the vehicle, wherein the first rail comprises a pair of lower rail bodies forming a channel therebetween by being disposed at a distance from each other, and the first slider is coupled to the channel to be movable along the channel and to apply the external force of the gas spring along a longitudinal direction of the channel, wherein a coupling hole extended along a length direction of the first slider is formed at a front end of the first slider, wherein a swing bracket at a door side of the first rail is integrally coupled to the coupling hole, wherein the swing bracket at the door side is relatively rotatably coupled with respect to a door bracket non-movably mounted to the front lower portion of the vehicle door, wherein the swing bracket at the door side comprises:
 a swing bracket body substantially formed in a shape of a "T"; and
 a first shaft hole formed at a front end of the swing bracket body, and wherein the door bracket includes a rotation shaft rotatably inserted in the first shaft hole and is rotatably coupled thereto.

2. The sliding door support apparatus of claim 1, wherein a vehicle body bracket is fixedly mounted to the vehicle body,
 a swing bracket on the vehicle body is relatively rotatably mounted to the vehicle body bracket, and
 one end of the first rail is coupled to the swing bracket on the vehicle body at a vehicle body side.

3. The sliding door support apparatus of claim 2, wherein the vehicle body bracket comprises:
 a bracket body substantially formed in a shape of an "L" and fixedly mounted to the vehicle body; and
 a rotation shaft integrally formed in a height direction of the vehicle to the bracket body, and the swing bracket at the vehicle body side comprises:
 a second shaft hole to which the rotation shaft is fitted and rotatably coupled; and
 a swing bracket body substantially formed in a shape of a "U" and to which the one end of the first rail is mounted.

4. The sliding door support apparatus of claim 1, wherein the pair of lower rail bodies are formed substantially in a shape of a quadrangle.

5. A sliding door device comprising:
 the sliding door support apparatus of the vehicle of claim 1;
 a rear lower support device supporting a rear lower portion of the vehicle door to be slidably-movable; and
 an upper support device supporting an upper portion of the vehicle door to be slidably movable.

6. The sliding door device of claim 5, wherein the rear lower support device comprises:
 a second rail extended along a length direction of the vehicle;
 a second slider coupled to the second rail and movable along the second rail; and
 a lower support of which a first end is coupled to the second slider and a second end is coupled to the rear lower portion of the vehicle door.

7. The sliding door device of claim 5, wherein the upper support device comprises:
 a third rail fixedly mounted to the vehicle door along a length direction of the door;
 a third slider coupled to the third rail and movable along the third rail; and
 an upper support of which a first end is connected to the third slider and a second end is mounted to the vehicle body to support the third slider to be linearly movable with respect to the vehicle body.

\* \* \* \* \*